United States Patent
Oshiro (10) Patent No.: US 6,804,623 B2
(45) Date of Patent: Oct. 12, 2004

(54) METHOD AND APPARATUS FOR DETECTING DECREASE IN TIRE AIR-PRESSURE, AND PROGRAM FOR JUDGING DECOMPRESSION OF TIRE

(75) Inventor: Yuji Oshiro, Kobe (JP)

(73) Assignee: Sumitomo Rubber Industries, Inc., Kobe (JP)

( * ) Notice: Subject to any disclaimer, the term of this patent is extended or adjusted under 35 U.S.C. 154(b) by 0 days.

(21) Appl. No.: 10/404,426

(22) Filed: Apr. 2, 2003

(65) Prior Publication Data

US 2003/0187607 A1 Oct. 2, 2003

(30) Foreign Application Priority Data

Apr. 2, 2002 (JP) ........................................ 2002-100239

(51) Int. Cl.[7] ........................... G06F 15/00; B60C 23/00
(52) U.S. Cl. ........................ 702/140; 702/141; 702/142; 702/146; 702/148; 340/441; 340/442; 340/443; 340/73; 340/146.2
(58) Field of Search ................................ 702/140, 141, 702/142, 145, 148, 85, 96; 340/441, 442, 443, 444; 73/146.2, 146.5, 146.7; 701/29, 35, 36, 71

(56) References Cited

U.S. PATENT DOCUMENTS

| | | | |
|---|---|---|---|
| 5,583,483 A | | 12/1996 | Baumann |
| 6,137,400 A | * | 10/2000 | Yanase et al. .............. 340/442 |
| 6,317,667 B1 | * | 11/2001 | Oshiro .......................... 701/29 |
| 6,339,957 B1 | * | 1/2002 | Yanase et al. ................. 73/146 |
| 6,420,966 B2 | * | 7/2002 | Sugisawa ..................... 340/442 |
| 6,529,851 B1 | * | 3/2003 | Oshiro ......................... 702/148 |

FOREIGN PATENT DOCUMENTS

| | | |
|---|---|---|
| EP | 0 650 856 A1 | 5/1995 |
| EP | 0 724 974 A1 | 8/1996 |
| JP | 10/206460 | 8/1998 |

* cited by examiner

*Primary Examiner*—Bryan Bui
(74) *Attorney, Agent, or Firm*—Birch, Stewart, Kolasch & Birch, LLP (57) ABSTRACT

A method for detecting decrease in tire air-pressure in which decrease in internal pressure of a tire is detected on the basis of rotational information obtained from tires attached to a vehicle. The method includes the steps of; detecting and storing rotational information of the respective tires; calculating and storing a slip rate; calculating and storing a correction coefficient for correcting a difference in effective rolling radii owing to initial differences between right and left front tires, a correction coefficient between right and left rear tires and a correction coefficient between front tires and rear tires; comparing a correction coefficient between front tires and rear tires with a correction coefficient between the front tires and the rear tires preliminarily obtained when at normal internal pressure; and judging simultaneous decompression of two wheel tires of both front wheels or simultaneous decompression of two wheel tires of both rear wheels on the basis of a relationship between a value obtained through comparison of the two correction coefficients and a specified threshold.

9 Claims, 6 Drawing Sheets

METHOD AND APPARATUS FOR DETECTING DECREASE IN TIRE AIR-PRESSURE, AND PROGRAM FOR JUDGING DECOMPRESSION OF TIRE

This nonprovisional application claims priority under 35 U.S.C. §119(a) on Patent Application No(s). 2002-100239 filed in JAPAN on Apr. 2, 2002, which is (are) herein incorporated by reference.

BACKGROUND OF THE INVENTION

The present invention relates to a method and apparatus for detecting decrease in tire air-pressure, and a program for judging decompression of a tire. More particularly, it relates to a method and apparatus for detecting decrease in tire air-pressure, and a program for judging decompression of a tire with which it is possible to detect simultaneous decompression of both front wheels or rear wheels.

There has been conventionally known an apparatus for detecting decrease in tire air-pressure (DWS) in which decompression of a tire is detected on the basis of rotational (wheel speed) information of four wheel tires attached to a vehicle. Such an apparatus employs a theory that a rotational velocity or a rotational angular velocity of a compressed tire is increased when compared to remaining normal tires owing to a decrease in outer diameter (dynamic load radius of the tire) from that of a tire of normal internal pressure. In a method for detecting decrease in internal pressure on the basis of a relative difference in rotational angular velocities of tires (reference should be made to Japanese Unexamined Patent Publication No. 305011/1988), $$DEL=\{(F1+F4)/2-(F2+F3)/2\}/\{(F1+F2+F3+F4)/4\}\times 100\ (\%)$$

is employed as a judged value DEL. Here, F1 to F4 denote rotational angular velocities of a front left tire, a front right tire, a rear left tire and a rear right tire, respectively.

Since the tires are manufactured to include variations (initial differences) within standards, effective rolling radii of the respective tires are not necessarily identical with each other even though all of the tires are at normal internal pressure. This will result in variations in the rotational angular velocities of the respective tires. To cope with this point, there is proposed a technique in, for instance, Japanese Unexamined Patent Publication No. 206460/1998, in which initial correction coefficients for eliminating differences in effective rolling radii affecting rotational angular velocities are obtained whereupon the velocities of the respective tires are corrected by using such initial correction coefficients so as to perform judgment of decompression of tires on the basis of the judged values DEL.

However, since decompression is judged on the basis of a difference in sums of rotational angular velocities of the four wheels that are respectively located diagonally with respect to each other, it is impossible to simultaneously detect decompression of both front wheels or both rear wheels. It therefore exists the danger that fuel consumption is worsened through increase in rolling resistance of the tire and that a burst might be caused upon continuing running without being aware of decompression.

SUMMARY OF THE INVENTION

In view of the above facts, it is an object of the present invention to provide a method and apparatus for detecting decrease in tire air-pressure, and a program for judging decompression of a tire with which it is possible to detect simultaneous decompression of both front wheels or both rear wheels.

In accordance with a first aspect of the present invention, there is provided a method for detecting decrease in tire air-pressure in which decrease in internal pressure of a tire is detected on the basis of rotational information obtained from tires attached to a vehicle. The method includes the steps of: detecting and storing rotational information of the respective tires; calculating and storing a slip rate; calculating and storing a correction coefficient for correcting a difference in effective rolling radii owing to initial differences between right and left front tires, a correction coefficient for correcting a difference in effective rolling radii owing to initial differences between right and left rear tires and a correction coefficient for correcting a difference in effective rolling radii owing to initial differences between front tires and rear tires; comparing a correction coefficient between front tires and rear tires obtained from rotational information which are gained from tires attached to the vehicle when performing cornering running other than freewheeling with a correction coefficient between the front tires and the rear tires preliminarily obtained when at normal internal pressure; and judging simultaneous decompression of two wheel tires of both front wheels or simultaneous decompression of two wheel tires of both rear wheels on the basis of a relationship between a value obtained through comparison of the two correction coefficients and a specified threshold.

In accordance with a second aspect of the present invention, there is provided an apparatus for detecting decrease in tire air-pressure in which decrease in internal pressure of a tire is detected on the basis of rotational information obtained from tires attached to a vehicle. The apparatus includes: rotational information detecting means which detects the rotational information of the respective tires; rotational information storing means which stores the rotational information of the respective tires; slip rate calculating and storing means which calculates and stores a slip rate; correction coefficient calculating and storing means which calculates and stores a correction coefficient for correcting a difference in effective rolling radii owing to initial differences between right and left front tires, a correction coefficient for correcting a difference in effective rolling radii owing to initial differences between right and left rear tires and a correction coefficient for correcting a difference in effective rolling radii owing to initial differences between front tires and rear tires; comparing means which compares a correction coefficient between front tires and rear tires obtained from rotational information which are gained from tires attached to the vehicle when performing cornering running other than freewheeling with a correction coefficient between the front tires and the rear tires preliminarily obtained when at normal internal pressure; and decompression judging means which judges simultaneous decompression of two wheel tires of both front wheels or simultaneous decompression of two wheel tires of both rear wheels on the basis of a relationship between a value obtained through comparison of the two correction coefficients and a specified threshold.

In accordance with a third aspect of the present invention, there is provided a program for judging decompression of a tire, in which for judging decrease in air-pressure of a tire, a computer is made to function as rotational information storing means which stores the rotational information of the respective tires; slip rate calculating and storing means which calculates and stores the slip rate; correction coefficient calculating and storing means which calculates and stores a correction coefficient for correcting a difference in effective rolling radii owing to initial differences between right and left front tires, a correction coefficient for correcting a difference in effective rolling radii owing to initial differences between right and left rear tires and a correction coefficient for correcting a difference in effective rolling radii owing to initial differences between front tires and rear tires; comparing means which compares a correction coefficient between front tires and rear tires obtained from rotational information which are gained from tires attached to the vehicle when performing cornering running other than freewheeling with a correction coefficient between the front tires and the rear tires preliminarily obtained when at normal internal pressure; and decompression judging means which judges simultaneous decompression of two wheel tires of both front wheels or simultaneous decompression of two wheel tires of both rear wheels on the basis of a relationship between a value obtained through comparison of the two correction coefficients and a specified threshold.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION

The method and apparatus for detecting decrease in tire air-pressure, and the program for judging decompression of a tire according to the present invention will now be explained on the basis of the accompanying drawings.

Figure 1:
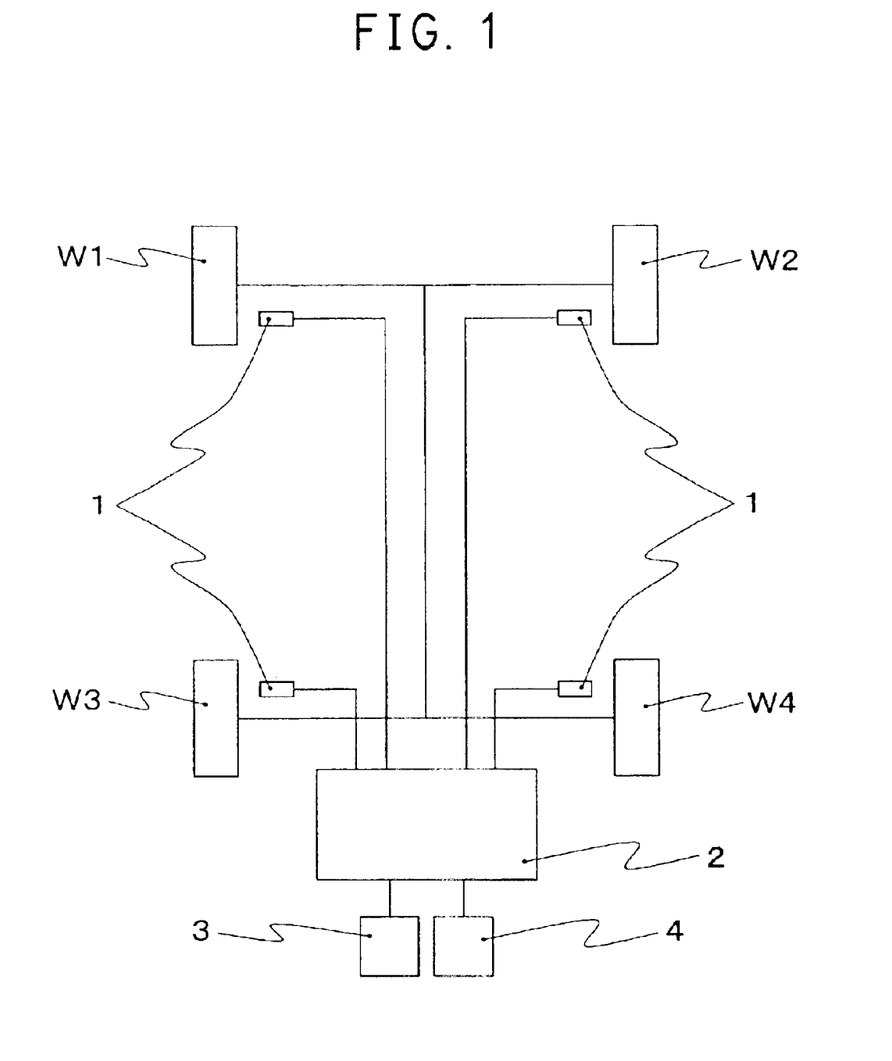
FIG. 1 is a block diagram illustrating one embodiment of an apparatus for detecting decrease in tire air-pressure according to the present invention.

As illustrated in FIG. 1, the apparatus for detecting decrease in tire air-pressure according to one embodiment of the present invention is for detecting whether any of the air-pressures of four tires W1, W2, W3 and W4 (herein after generally referred to as Wi, wherein i=1 to 4, 1: front left tire, 2: front right tire, 3: rear left tire, 4: rear right tire) attached to a four-wheeled vehicle is decreased or not, and is composed of ordinary rotational information detecting means 1 which are provided in relation to the respective tires Wi.

The rotational information detecting means 1 might be a wheel speed sensor for measuring rotational angular velocities or a wheel speed (rotational velocity) as rotational information on the basis of number of pulses upon generating rotational pulses by using an electromagnetic pickup and the like, or an angular velocity sensor in which power is generated through rotation such as in a dynamo, wherein the rotational information is measured from a voltage thereof. Outputs of the rotational information detecting means 1 are supplied to a control unit 2 which might be a computer such as an ABS. A display device 3 composed of liquid crystal elements, plasma display elements or CRT for informing a tire Wi of which the tire air-pressure has decreased and an initialization switch 4 which might be operated by a driver are connected to the control unit 2.

The initialization switch 4 is provided for operation by the user when correction coefficients (K1, K2, K3) for eliminating effects of initial differences between tires Wi are to be calculated. Initial differences are variations in effective rolling radii of the respective tires Wi (a value obtained by dividing a distance which has been traveled by a single rotation by 2 $\pi$) within standards.

Figure 2:
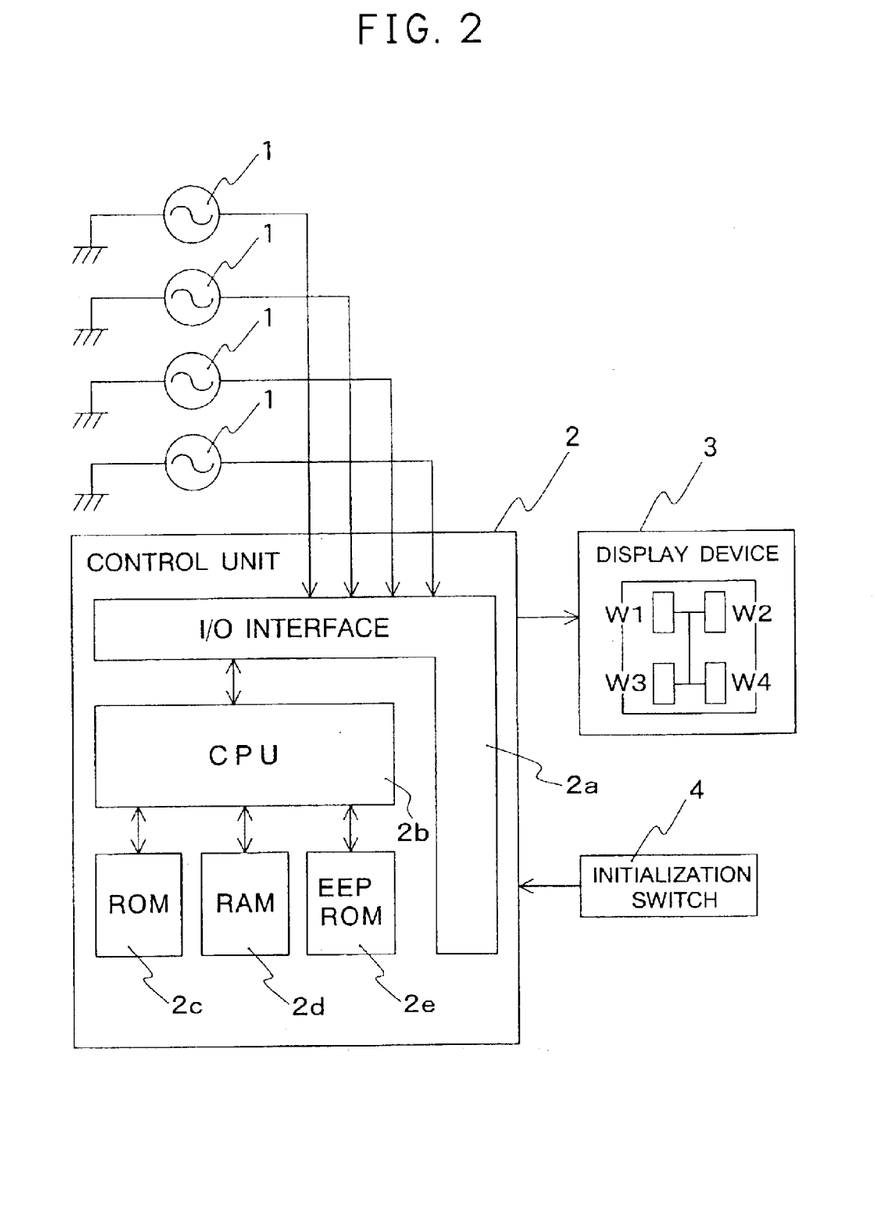
FIG. 2 is a block diagram illustrating electric arrangements of the apparatus for detecting decrease in tire air-pressure of FIG. 1.

As illustrated in FIG. 2, the control unit 2 comprises an I/O interface 2a required for sending/receiving signals to/from an external device, a CPU 2b which functions as a center of calculation, a ROM 2c which stores a control operation program for the CPU 2b, a RAM 2d into which data are temporally written and are read out therefrom when the CPU 2b performs control operations, and an EEPROM 2e. A footbrake sensor (not shown) for detecting whether the footbrake has been actuated or not is connected to the control unit 2.

A part of a memory region of the RAM 2d is employed as a counter which is used in processes for calculating correction coefficients as will be described later. The EEPROM 2e stores therein, among others, correction coefficients preliminarily obtained when at normal internal pressure.

According to the present embodiment, correction coefficients for correcting a difference between effective rolling radii owing to initial differences between front tires and rear tires when at normal internal pressure and also when performing running are obtained from among correction coefficients for eliminating differences between effective rolling radii which affect differences in rotational angular velocities Fi of the respective tires Wi. Since the correction coefficient changes during running in the presence of simultaneous decompression of two wheel tires of both front tires or two wheel tires of both rear tires or in the presence of decompression of one tire from among the front or rear wheels, though degrees of decompression might differ, fluctuations from the correction coefficient when at normal internal pressure are observed. With this arrangement, it is possible to judge decompression of a tire.

Accordingly, the present embodiment is composed of rotational information detecting means 1 which detects the rotational information of the respective tires Wi; rotational information storing means which stores the rotational information of the respective tires Wi; slip rate calculating and storing means which calculates and stores a slip rate; correction coefficient calculating and storing means which calculates and stores a correction coefficient for correcting a difference in effective rolling radii owing to initial differences between right and left front tires, a correction coefficient for correcting a difference in effective rolling radii owing to initial differences between right and left rear tires and a correction coefficient for correcting a difference in effective rolling radii owing to initial differences between front tires and rear tires; comparing means which compares a correction coefficient between front tires and rear tires obtained from rotational information which are gained from tires attached to the vehicle when performing cornering running other than freewheeling with a correction coefficient between the front tires and the rear tires preliminarily obtained when at normal internal pressure; and decompression judging means which judges simultaneous decompression of two wheel tires of both front wheels or simultaneous decompression of two wheel tires of both rear wheels on the basis of a relationship between a value obtained through comparison of the two correction coefficients and a specified threshold. It further comprises a means for calculating a velocity of the vehicle, a means for calculating a turning radius of the vehicle, and a means for calculating a lateral directional acceleration of the vehicle.

The program for judging decompression of a tire according to the present embodiment is so arranged that the control unit 2 is made to function as rotational information storing means which stores the rotational information of the respective tires Wi; slip rate calculating and storing means which calculates and stores the slip rate; correction coefficient calculating and storing means which calculates and stores a correction coefficient for correcting a difference in effective rolling radii owing to initial differences between right and left front tires, a correction coefficient for correcting a difference in effective rolling radii owing to initial differences between right and left rear tires and a correction coefficient for correcting a difference in effective rolling radii owing to initial differences between front tires and rear tires; comparing means which compares a correction coefficient between front tires and rear tires obtained from rotational information which are gained from tires attached to the vehicle when performing cornering running other than freewheeling with a correction coefficient between the front tires and the rear tires preliminarily obtained when at normal internal pressure; and decompression judging means which judges simultaneous decompression of two wheel tires of both front wheels or simultaneous decompression of two wheel tires of both rear wheels on the basis of a relationship between a value obtained through comparison of the two correction coefficients and a specified threshold. The control unit 2 is further made to function as the means for calculating a velocity of the vehicle, the means for calculating a turning radius of the vehicle, and the means for calculating a lateral directional acceleration of the vehicle.

Pulse signals corresponding to the rotational number of tires Wi (hereinafter referred to as "wheel speed pulse") are output from the rotational information detecting means 1. In the CPU 2b, rotational angular velocities Fi for the respective tires Wi are calculated on the basis of the wheel speed pulses output from the rotational information detecting means 1 at specified sampling periods $\Delta T(sec)$, for instance, $\Delta T=1$.

Processes for detecting decrease in tire air-pressure in the apparatus for detecting decrease in tire air-pressure are performed at each sampling period $\Delta T$ by the control unit 2 affected by the operation of the CPU 2b in accordance with a specified program stored in the ROM 2c.

The rotational angular velocities Fi might include errors depending on the magnitude of the velocity of the vehicle (hereinafter referred to as the "vehicle velocity"), front and rear directional acceleration of the respective tires Wi, the turning radius of the vehicle or the lateral directional acceleration of the vehicle, and errors might also be included when the footbrake is being actuated. Processes for judging whether a rotational angular velocity Fi is to be rejected or not is performed on the basis of the fact whether possibilities that errors are included in the calculated rotational angular velocity Fi are high or not.

More particularly, when the vehicle is running at extremely low speed, detection accuracies of the rotational information detecting means 1 will be remarkably degraded so that possibilities that errors are included in the calculated rotational angular velocity Fi are high. Further, when the front and rear directional accelerations of the respective tires Wi are relatively large and when the footbrake is being actuated, influences of slip of tires Wi owing to, for instance, abrupt acceleration or abrupt deceleration of the vehicle might be generated, so that possibilities that errors are included in the calculated rotational angular velocity Fi are high. When the turning radius of the vehicle is relatively small or when the lateral directional acceleration of the vehicle is relatively large, the tires Wi are apt to sideslip so that possibilities that errors are included in the calculated rotational angular velocity Fi are high.

In this manner, when possibilities that errors are included in the calculated rotational angular velocity Fi are high, it is preferable not to employ the rotational angular velocity Fi for detecting decrease in air-pressure but to reject (eliminate) it. On the other hand, as it is generally known, the lateral direction acceleration of a vehicle is proportional to a square of the vehicle velocity. Accordingly, when the vehicle velocity is calculated on the basis of the rotational angular velocities Fi and a large variation in rotational angular velocities Fi is present, influences of such a variation on the lateral directional acceleration of the vehicle will rapidly increase as the vehicle velocity becomes higher. The lateral directional acceleration of the vehicle will accordingly include large errors.

Moreover, since rotational angular velocities Fi will be varied owing to initial differences, it is preferable to perform reject judgment of the lateral directional acceleration of the vehicle upon eliminating influences of such initial differences from the rotational angular velocities Fi. Further, when the vehicle velocity is calculated on the basis of the rotational angular velocities Fi, influences of variations in rotational angular velocities Fi owing to initial differences with respect to the turning radius of the vehicle will rapidly increase as the vehicle velocity becomes higher. It is therefore also preferable to perform reject judgment of the turning radius of the vehicle upon eliminating influences of such initial differences from the rotational angular velocities Fi.

It is accordingly preferable to perform two separate reject judgments. More particularly, a reject judgment related to the velocity V, the front and rear directional accelerations FRAi of the respective tires Wi and the footbrake is first performed, and reject judgment related to the lateral directional acceleration LA of the vehicle and the turning radius R of the vehicle after eliminating influences of initial differences are performed thereafter.

One example of operations of the apparatus for detecting decrease in tire air-pressure according to the present embodiment will now be explained along processes (1) to (14). It should be noted that while correction of initial differences is performed in the following explanations for the purpose of reducing variations in rotational angular velocities and of accordingly performing highly accurate judgment of decompression, the present invention is not limited to this, and it is alternatively possible to perform judgment of decompression while omitting correction of initial differences. Further, it is supposed in the following explanations that the vehicle of object is a FF (front engine/front drive) vehicle.

Figure 3:
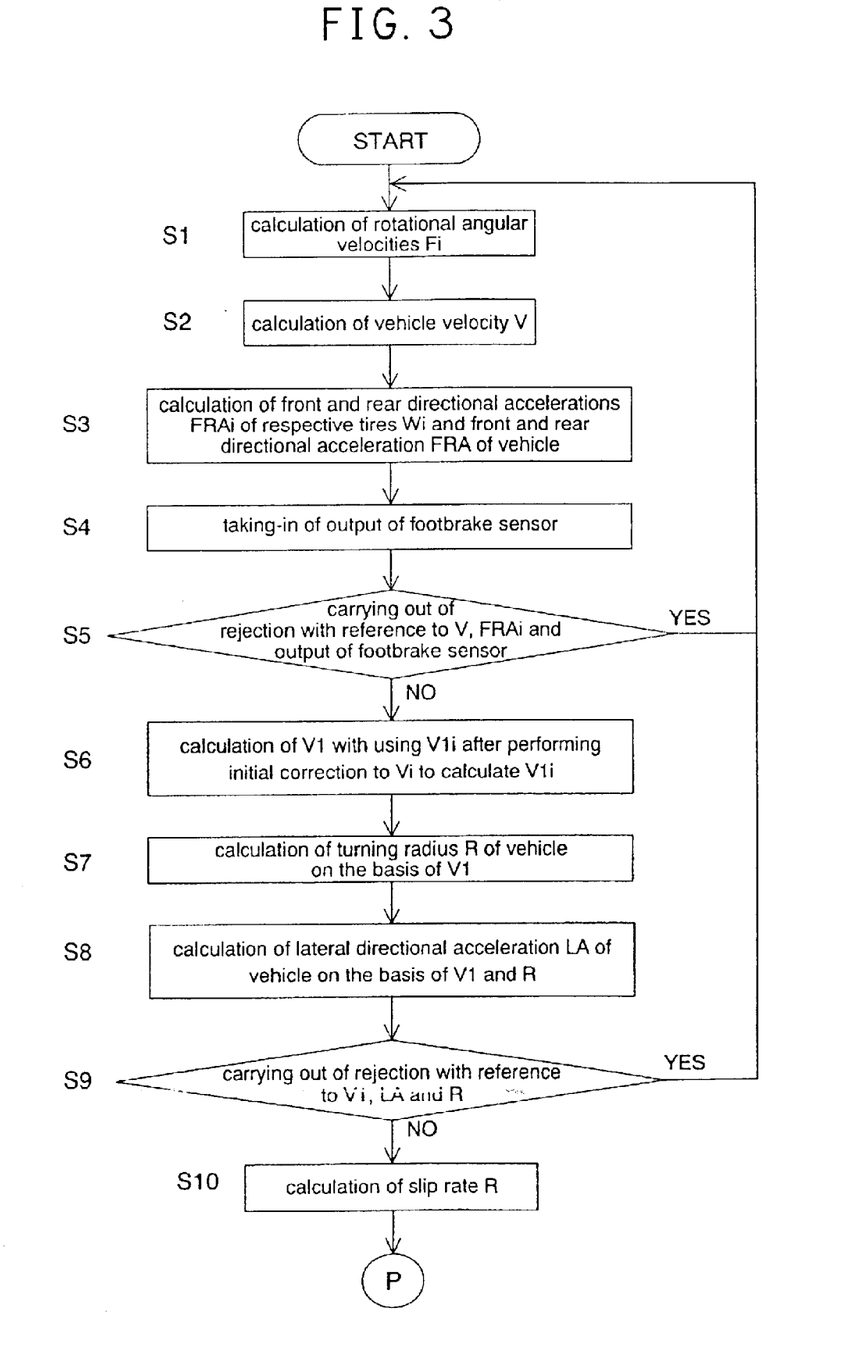
FIG. 3 is one example of a flowchart of the present invention.

(1) As illustrated in FIG. 3, the CPU $2b$ calculates the rotational angular velocities Fi of the respective tires Wi on the basis of the wheel speed pulse which is output from the rotational information detecting means 1 (Step S1).

(2) Then, the vehicle velocity V is calculated on the basis of the velocities Vi of the respective tires Wi (Step S2). The velocities Vi of the respective tires Wi are calculated in accordance with the following equation (1). Here, r denotes a constant corresponding to the effective rolling radius at the time of performing straight-ahead running and is stored in the ROM $2c$.

$$Vi = r \times Fi \qquad (1)$$

The vehicle velocity V is calculated from the following equation (2) on the basis of the calculated velocities Vi of the respective tires Wi.

$$V = (V1 + V2 + V3 + V4)/4 \qquad (2)$$

(3) Then, the front and rear directional accelerations FRAi of the respective tires Wi are calculated from the following equation (3) provided that the velocities of the respective tires Wi calculated in the previous sampling period are Bvi (Step S3).

$$FRAi = (Vi - Bvi)/(\Delta T \times 9.8) \qquad (3)$$

It should be noted that the reason why 9.8 (m/sec$^2$) is inserted into the denominator in equation (3) is that the front and rear directional accelerations FRAi of the respective tires Wi are to be converted into G (gravitational acceleration).

The front and rear directional acceleration FRA of the vehicle is calculated from the following equation (4) on the basis of the front and rear directional accelerations FRAi of the respective tires Wi (Step S3).

$$FRA = (FRA1 + FRA2 + FRA3 + FRA4)/4 \qquad (4)$$

It should be noted that the vehicle velocity V and the front and rear directional acceleration FRA of the vehicle might also be obtained by directly detecting these values by using sensors.

(4) It is then judged whether the rotational angular velocity Fi as calculated in the current sampling period is to be rejected on the basis of the vehicle velocity V, the front and rear directional accelerations FRAi of the respective tires Wi and the output (Step S4) of the footbrake sensor (Step S5). More particularly, should anyone of the following three conditions [1] to [3] be satisfied, the rotational angular velocity Fi is rejected.

[1] $V < V_{TH}$ (for instance, $V_{TH} = 10$(km/h))

[2] MAX$\{|FRAi|\} > A_{TH}$ (for instance, $A_{TH} = 0.1$ G)

[3] The footbrake is being actuated.

(5) Then, the velocities Vi (=r×Fi) of the respective tires Wi are corrected to obtain new velocities $V1_i$.

$$V1_1 = V1 \qquad (5)$$

$$V1_2 = K1 \times V2 \qquad (6)$$

$$V1_3 = K3 \times V3 \qquad (7)$$

$$V1_4 = K2 \times K3 \times V4 \qquad (8)$$

Here, K1, K2 and K3 are correction coefficients which have been preliminarily obtained when at normal internal pressure, wherein K1 corresponds to a correction coefficient for correcting a difference in effective rolling radii owing to initial differences between right and left front tires W1, W2; K2 corresponds to a correction coefficient for correcting a difference in effective rolling radii owing to initial differences between right and left rear tires W3, W4; and K3 corresponds to a correction coefficient for correcting a difference in effective rolling radii owing to initial differences between the front tire W1 and the right and left rear tires W3, W4. These correction coefficients K1, K2 and K3 are obtained from running tests performed when at normal internal pressure and are stored in the RAM $2d$. It should be noted that when the correction coefficients obtained when at normal internal pressure are K1=2, K2=2 and K3=1.5, respectively, and the vehicle is running with the velocity V1 of the front left tire being 6, the velocity V2 of the front right tire being 3, the velocity V3 of the rear left tire being 4, and the velocity V4 of the rear right tire being 2, the velocities $V1_i$ (i=1 to 4) of the tires after correction will be 6, and the velocities of all tires will become equal to V1. In other words, the velocities of the tires are corrected such that the velocity of the tires after correction will be identical with the velocity of the front left tire.

On the basis of the velocities $V1_i$ of the respective tires Wi after correction, the vehicle velocity V1 is calculated by using the following equation (9) (Step S6). In this manner, it is possible to obtain a vehicle velocity V1 of which influences of initial differences have been eliminated.

$$V1 = (V1_1 + V1_2 + V1_3 + V1_4)/4 \qquad (9)$$

(6) Then, the turning radius R of the vehicle is calculated on the basis of the vehicle velocity V1 (Step S7). As illustrated in the following equation (10), the turning radius $R_0$ of the vehicle is first calculated.

$$R_0 = \frac{Tw}{2} \times \frac{V1_4 + V1_3}{V1_4 - V1_3} \qquad (10)$$

Here, Tw denotes a tread width (distance between right and left wheels).

Then, corrections for eliminating influences of load shift of the vehicle on the turning radius Ro of the vehicle are performed on the basis of the following equation (11).

$$R = R_0 \times \{u1 + u2 \times (V1_3 + V1_4)^2\} \qquad (1)$$

Here, u1 and u2 are given from the following equations (12) to (14). In the equations (12) to (14), Q denotes load of the vehicle, H denotes a height from a grounding surface of the tires to a center of gravity of the vehicle, and a denotes a ratio of fluctuation of the effective rolling radius of the tire to the load.

$$u1 = 1 \qquad (12)$$

$$u2 = \frac{1}{9.8} \times \frac{\beta}{2Tw} \qquad (13)$$

$$\text{wherein } \beta = \frac{Q \times H \times \alpha}{Tw \times 100} \qquad (14)$$

(7) Then, the lateral directional acceleration LA of the vehicle is calculated by using the following equation (15) on the basis of the vehicle velocity VI and the turning radius R of the vehicle (Step S8).

$$LA = V1^2/(R \times 9.8) \qquad (15)$$

It should be noted that the reason why 9.8 (m/sec²) is inserted into the denominator is that the lateral directional acceleration LA is to be converted into G (gravitational acceleration). The lateral directional acceleration LA might also be obtained by directly detecting these values by using sensors.

(8) It is then judged whether the rotational angular velocity Fi as calculated in the current sampling period is to be rejected on the basis of the lateral directional acceleration LA of the vehicle and the turning radius R of the vehicle calculated by above equations (Step S9).

More particularly, should either of the following conditions [1] and [2] be satisfied, the rotational angular velocity Fi is rejected. It should be noted that the lateral directional acceleration LA of the vehicle might alternatively be obtained from the output of the steering sensor and the vehicle velocity.

[1] $|LA|>LA_{TH}$ (for instance, $LA_{TH}=0.4$ G)

[2] $|R|<R_{TH}$ (for instance, RTH=30(m))

(9) Upon eliminating rotational angular velocities Fi which are most likely to include errors by performing the above processes, a slip rate Rs (front and rear wheel ratio −1) is calculated by using the following equation (16) on the basis of the velocities $V1_i$ of the respective tires Wi (Step S10).

$$Rs = \frac{V1_1 + V1_2}{V1_3 + V1_4} - 1 \quad (16)$$

The slip rate Rs of the equation (16) might be represented as the following equation (17) on the basis of the above equation (5) to (8).

$$Rs = \frac{V1 + K1 \times V2}{K3 \times V3 + K2 \times K3 \times V4} - 1 \quad (17)$$

Thus, the slip rate Rs might be defined to be a slip rate which is obtained by using K3 (K1, K2).

(10) Next, when running on public roads, the number of vehicles driving thereon is large and the frequency in which a vehicle performs straight-ahead running and at the same time freewheeling is limited when ordinarily running. Public roads include not only roads of relatively straight-running roads such as speedways but also roads with many curves such as mountain roads. In other words, judgment of decompression cannot be performed only when it is judged that the vehicle is performing straight-ahead running and when it is judged that the vehicle is performing freewheeling. Accordingly, judgment of decompression shall be made by using a coefficient which might be calculated also when the vehicle is not performing straight-ahead running and freewheeling when ordinarily running but it will be sufficient when the vehicle is performing cornering running other than freewheeling (hereinafter simply referred to as "cornering running").

Figure 4:
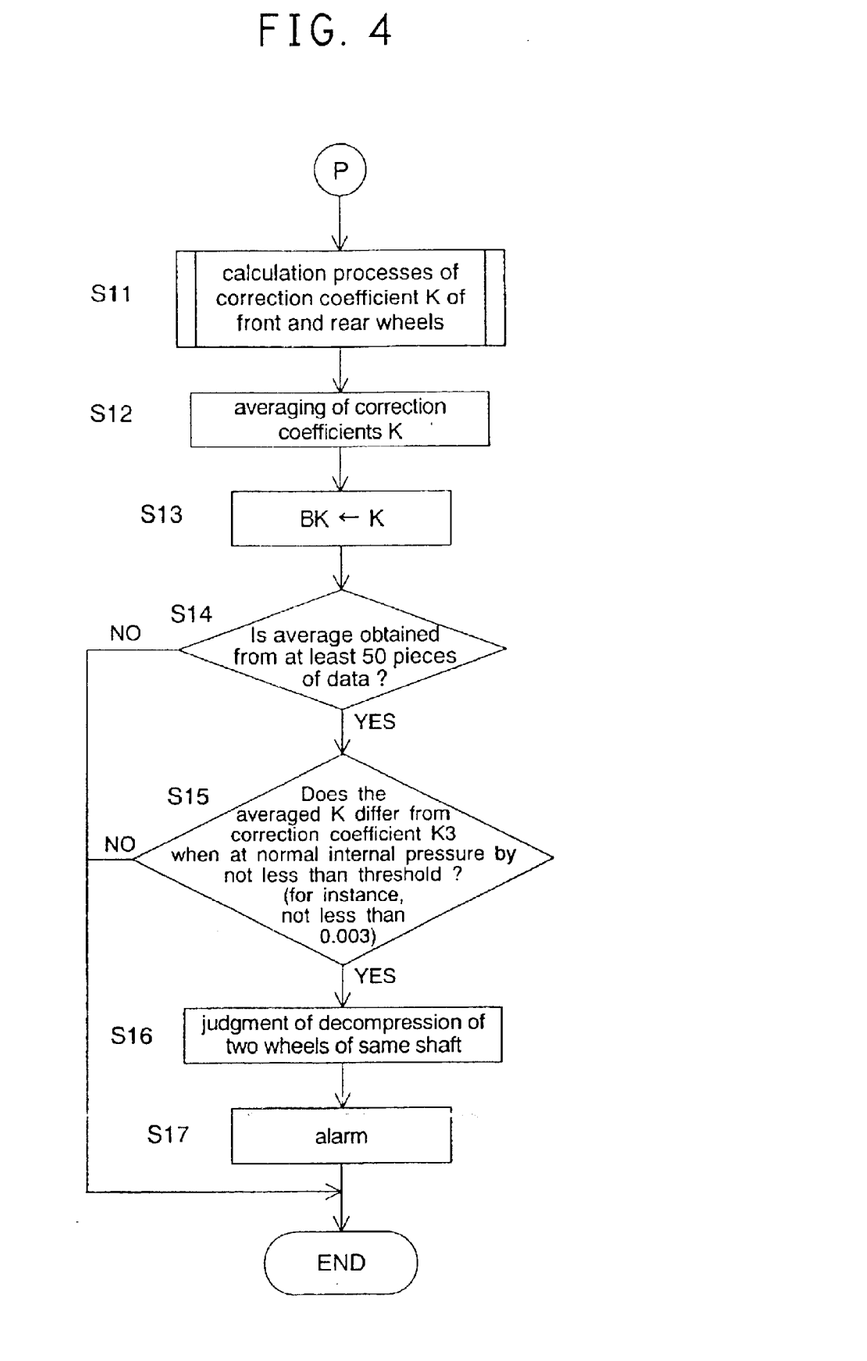
FIG. 4 is one example of a flowchart of the present invention.

More particularly, as illustrated in FIG. 4, calculation processes of the correction coefficients K of the front and rear wheels are performed provided that the vehicle is performing cornering running (Step S11). Here, the correction coefficient K corresponds to the correction coefficient K3 for correcting a difference in effective rolling radii owing to initial differences between the front tire W1 and the right and left rear tires W3, W4. The correction coefficient K is stored in the RAM 2d.

Figure 5:
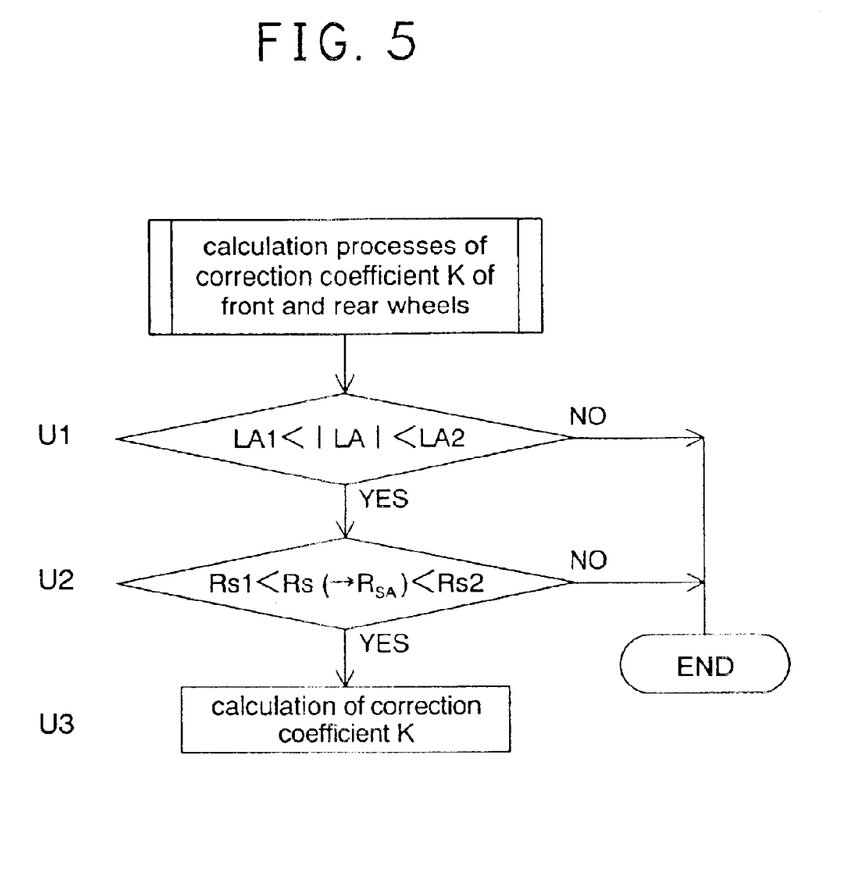
FIG. 5 is one example of a flowchart for explaining processes for calculating correction coefficients K for the front wheels and the rear wheels in FIG. 4.

[1] First, as illustrated in FIG. 5, it is judged in Step U1 whether the vehicle is performing cornering running. Whether the vehicle is performing cornering running or not is judged whether the lateral directional acceleration LA of the vehicle satisfies conditions of the following equation (18) or not. Suppose that LA1=0.08 G and LA2=0.4 G are satisfied in the equation (18). This is because when the accuracy of the lateral directional acceleration LA of the vehicle is low, the accuracy of the correction coefficient K obtained from equation (25) to be described later will accordingly be low.

$$LA1<|LA|<LA2 \quad (18)$$

When it is judged from this equation (18) that the vehicle is not performing cornering running, the processes are terminated. On the other hand, when the vehicle is performing cornering running, the process proceeds to the next Step U2.

[2] In Step U2, it is judged whether the slip rate Rs of the driving tires W1, W2 calculated in the above process (9) satisfy the following equation (19). In equation (19), Rs1 and Rs2 are constants, and might exemplarily satisfy Rs1=0 and Rs2=0.008.

$$Rs1<Rs<Rs2 \quad (19)$$

Here, the slip rate Rs might be substituted by $R_{SA}$ obtained from equation (21) to be described later when the correction coefficients K become stable to some extent by using, for instance, 50 or more pieces of data.

When the equation (19) is not satisfied, the processes are terminated.

[3] The correction coefficient K is then calculated (Step U3).

When the above equation (19) is satisfied, the correction coefficient K is calculated on the basis of the calculated judged value D and the slip rate $R_{SA}$.

Since the rotational angular velocities F1 to F4 of the respective tires of which influences of initial differences or others have been eliminated vary also due to factors such as load shift or the amount of slip of the vehicle when performing cornering running, variations in the rotational angular velocities F1 to F4 owing to the load shift and the amount of slip of the vehicle are corrected by using the following equation (20) when obtaining the judged value D as indicated in the prior art.

$$Do=D-(A1 \times LA + A2 \times LA \times R_{SA}) \quad (20)$$

In the equation (20), A1 and A2 are constants, and $R_{SA}$ is a slip rate. Since the slip rate $R_{SA}$ corresponds to a ratio of the rotational angular velocity of the driving tires to the rotational angular velocity of the follower tires, the slip rate might be represented similar to the above equation (17) by using the correction coefficient K when performing cornering running.

$$R_{SA} = \frac{V1 + K1 \times V2}{K \times V3 + K2 \times K \times V4} - 1 \quad (21)$$

On the other hand, since the correction coefficients K1 to K3 are normally calculated when all of the four tires are at normal internal pressure after performing, for instance, exchange of tires, the judged value Do should be 0 (zero) when performing cornering running provided that the correction coefficients K1 to K3 have been correctly obtained. Thus, the following equation (22) might be obtained upon substituting 0 into Do in the equation (20) and adjusting the slip rate $R_{SA}$.

$$R_{SA} = \frac{D - A1 \times LA}{A2 \times LA} \quad (22)$$

In this manner, the slip rate $R_{SA}$ might also be calculated on the basis of the lateral directional acceleration LA of the vehicle and the judged value D.

The slip rate $R_{SA}$ which is represented by this equation (22) is substituted into the following equation (23) obtained by adjusting the above equation (21) for obtaining the correction coefficient K.

$$K = \frac{1}{R_{SA} + 1} \times \frac{V1 + K1 \times V2}{V3 + K2 \times V4} \quad (23)$$

The correction coefficient K obtained from this equation (23) is a value provided that the current status is normal internal pressure (=judged value Do=0). However, when two wheels of the same shaft of either the front wheels or the rear wheels are decompressed (an actually decompressed condition), the correction coefficient K will be a value which is different from the correction coefficient K3 preliminarily obtained when at normal internal pressure. Accordingly, decompression might be judged on the basis of the deviation between the correction coefficient K and the correction coefficient K3.

Upon introducing the correction coefficients BK which have been calculated in previous sampling periods and stored in the RAM 2d, the following equation (24) might be obtained. Note that C3 is a number of pieces of data calculated for K.

$$K = \frac{C3 - 1}{C3} \times BK + \frac{1}{C3} \times K \quad (24)$$

In this manner, the correction coefficient K might be calculated on the basis of the correction coefficients K1 and K2 when at normal internal pressure, the slip rate RSA and the velocities V1 to V4. Since the equation (23) for calculating the correction coefficient K is introduced from the equation for eliminating the load shift and the slip rate of the vehicle when performing cornering running from the rotational angular velocity Fi, a correction coefficient K of high accuracy might be calculated when the vehicle is performing cornering running. Therefore, a correction coefficient K of high accuracy might be calculated also when the vehicle is not performing straight-ahead running and freewheeling when ordinarily running but it will be suffice that the vehicle is performing cornering running.

(11) Then, as shown in FIG. 4, an averaged correction coefficient K can be calculated by obtaining an average of the previous correction coefficients K (BK) which have been calculated up to the immediately preceding sampling period (corresponding to equation (24)) (Steps S12 and S13).

(12) It is then judged whether the correction coefficient K obtained in Step 12 is an average of correction coefficients of, for instance, at least 50 pieces of data C3 (Step S14).

(13) When the conditions of Step S13 are satisfied, the obtained value is compared with the correction coefficient K3 preliminarily obtained when at normal internal pressure (Step S15). It is determined whether the value differs from, for instance, the correction coefficient K3 when at normal internal pressure by not less than a threshold. It should be noted that when this threshold is set to 0.003, which is a threshold with which it is possible to judge that two wheel tires of either both front wheels or both rear wheels are simultaneously decompressed by 25%, it can be judged from results of a running test (to be described later) that two wheel tires of both front wheels are simultaneously decompressed when the obtained value is larger than a value in which a positive (plus) threshold is added to the correction coefficient K3 when at normal internal pressure and that two wheel tires of the rear wheels are simultaneously decompressed when the obtained value is smaller than a value in which a negative (minus) threshold is subtracted therefrom (Step S16). When the threshold is set to 0.003 (threshold with which it is possible to judge that two wheel tires of either both front wheels or both rear wheels are simultaneously decompressed by 25%), it is also possible to judge that one wheel tire is decompressed by 50%. It should be noted that while a difference is calculated herein, it is also possible to perform judgment by seeing whether a ratio satisfies a specified threshold or not.

It should be noted that since the correction coefficient K of the above equation (24) is a ratio of the wheel speed ratio of the front wheels to the wheel speed ratio of the rear wheels, the correction coefficient K might also be described as a coefficient taking also the front wheel tire W2 into consideration. With this arrangement, it is possible to judge simultaneous decompression of two wheel tires of both front wheels or both rear wheel tires.

(14) An alarm is issued thereafter (Step S17).

While the present invention will now be explained on the basis of an example thereof, the present invention is not to be limited to such an example only.

EXAMPLE

A FF (front engine/front drive) car attached with tires of normal air-pressure ($2.2 \times 10^5$ Pa) was provided as a vehicle. A detection device storing therein a decompression judgment program with a threshold for the correction coefficient at the time of normal internal pressure being set to 0.003 was mounted thereon. The tire size of the tires was 215/50R17. As for running conditions of the vehicle, a condition in which the vehicle was made to run at constant speed (80 km/h) on a course with two passengers riding thereon was employed. The sampling time for the wheel speed of the wheels was set, for instance, to 1 second for accumulating a large number of data and also for eliminating variations or measuring errors.

Figure 6:
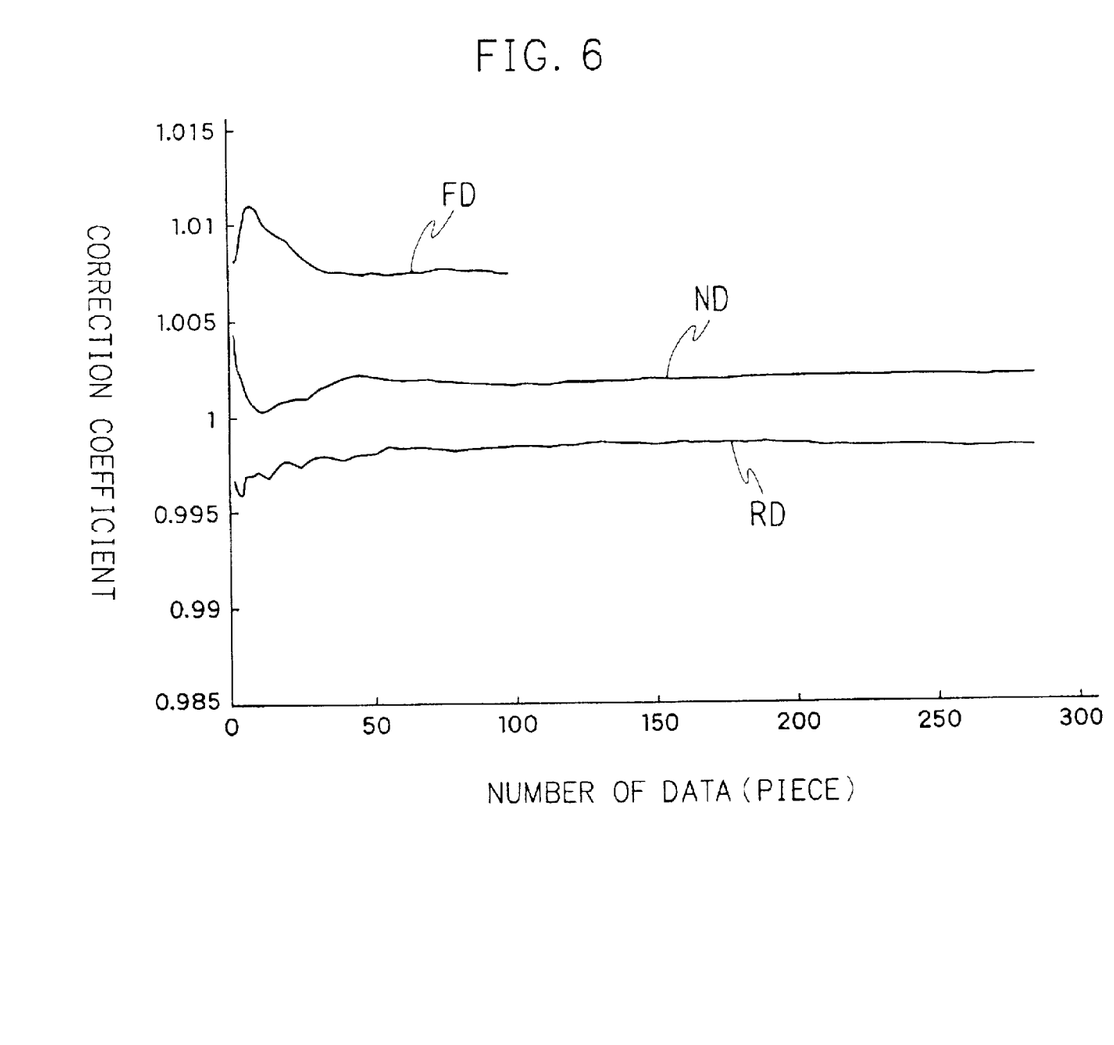
FIG. 6 is a view illustrating correction coefficients obtained through running tests with tires ND of normal internal pressure and running test with both front wheel tires FD and both rear wheel tires RD being decompressed by 25%, respectively.

Running tests with the tires ND being at normal internal pressure (correction coefficient K3 when at normal internal pressure) and running tests with both front wheel tires FD and both rear wheel tires RD being decompressed by 25% were performed. As illustrated in FIG. 6, it was accordingly found that since $K_{FD} > K3$ and $K_{RD} < K3$ was satisfied wherein the correction coefficient $K_{FD}$ represents decompression of both front wheel tires FD and the correction coefficient $K_{RD}$ decompression of both rear tires RD, judgment of simultaneous decompression of both front wheel tires FD or both rear wheel tires RD could be made by setting the threshold to 0.003.

As explained so far, it is particularly possible to judge simultaneous decompression of both front wheel tires or both rear tires when employing the present invention.

The invention being thus described, it will be obvious that the same may be varied in many ways. Such variations are not to be regarded as a departure from the spirit and ) scope of the invention, and all such modifications as would be obvious to one skilled in the art are intended to be included within the scope of the following claims.

What is claimed is:

1. A method for detecting decrease in tire air-pressure in which decrease in internal pressure of a tire is detected on the basis of rotational information obtained from tires attached to a vehicle, comprising the steps of:

detecting and storing rotational information of the respective tires;

calculating and storing a slip rate;

calculating and storing a correction coefficient for correcting a difference in effective rolling radii owing to initial differences between right and left front tires, a correction coefficient for correcting a difference in effective rolling radii owing to initial differences between right and left rear tires and a correction coefficient for correcting a difference in effective rolling radii owing to initial differences between front tires and rear tires;

comparing a first correction coefficient between front tires and rear tires obtained from rotational information which are gained from tires attached to the vehicle when performing cornering running other than freewheeling with a second correction coefficient between the front tires and the rear tires preliminarily obtained when at normal internal pressure; and judging simultaneous decompression of two wheel tires of both front wheels or simultaneous decompression of two wheel tires of both rear wheels on the basis of a relationship between a value obtained through comparison of the first and second correction coefficients and a specified threshold.

2. The method of claim 1, wherein the method further includes the steps of:

calculating a velocity of the vehicle;

calculating a turning radius of the vehicle; and calculating a lateral directional acceleration of the vehicle.

3. The method of claim 1, wherein the correction coefficient for correcting a difference in effective rolling radii owing to initial differences between front tires and rear tires and the second correction coefficient between the front tires and the rear tires preliminarily obtained when at normal internal pressure are the same.

4. An apparatus for detecting decrease in tire air-pressure in which decrease in internal pressure of a tire is detected on the basis of rotational information obtained from tires attached to a vehicle, comprising:

rotational information detecting means which detects the rotational information of the respective tires;

rotational information storing means which stores the rotational information of the respective tires;

slip rate calculating and storing means which calculates and stores a slip rate;

correction coefficient calculating and storing means which calculates and stores a correction coefficient for correcting a difference in effective rolling radii owing to initial differences between right and left front tires, a correction coefficient for correcting a difference in effective rolling radii owing to initial differences between right and left rear tires and a correction coefficient for correcting a difference in effective rolling radii owing to initial differences between front tires and rear tires;

comparing means which compares a first correction coefficient between front tires and rear tires obtained from rotational information which are gained from tires attached to the vehicle when performing cornering wnning other than freewheeling with a second correction coefficient between the front tires and the rear tires preliminarily obtained when at normal internal pressure; and decompression judging means which judges simultaneous decompression of two wheel tires of both front wheels or simultaneous decompression of two wheel tires of both rear wheels on the basis of a relationship between a value obtained through comparison of the first and second correction coefficients and a specified threshold.

5. The apparatus of claim 4, wherein the apparatus further includes:

a means for calculating a velocity of the vehicle;

a means for calculating a turning radius of the vehicle; and a means for calculating a lateral directional acceleration of the vehicle.

6. The apparatus of claim 4, wherein the correction coefficient for correcting a difference in effective rolling radii owing to initial differences between front tires and rear tires and the second correction coefficient between the front tires and the reartires preliminarily obtained when at normal internal pressure are the same.

7. A program embodied on a comDuter readable medium for judging decompression of a tire, comprising:

rotational information storing means which stores the rotational information of the respective tires;

slip rate calculating and storing means which calculates and stores the slip rate;

correction coefficient calculating and storing means which calculates and stores a correction coefficient for correcting a difference in effective rolling radii owing to initial differences between right and left front tires, a correction coefficient for correcting a difference in effective rolling radii owing to initial differences between right and left rear tires and a correction coefficient for correcting a difference in effective rolling radii owing to initial differences between front tires and rear tires;

comparing means which compares a first correction coefficient between front tires and rear tires obtained from rotational information which are gained from tires attached to the vehicle when performing cornering running other than freewheeling with a second correction coefficient between the front tires and the rear tires preliminarily obtained when at normal internal pressure; and decompression judging means which judges simultaneous decompression of two wheel tires of both front wheels or simultaneous decompression of two wheel tires of both rear wheels on the basis of a relationship between a value obtained through comparison of the first and second correction coefficients and a specified threshold.

8. The program embodied on a comouter readable medium of claim 7, further comorisina:

means for calculation a velocity of the vehicle;

a means for calculating a turning radius of the vehicle; and a means for calculating a lateral directional acceleration of the vehicle.

9. The program embodied on a computer readable medium of claim 7, wherein the correction coefficient for correcting a difference in effective rolling radii owing to initial differences between front tires and rear tires and the second correction coefficient between the front tires and the rear tires preliminarily obtained when at normal internal pressure are the same.

* * * * *